No. 856,976. PATENTED JUNE 11, 1907.
H. MILLER.
NUT LOCK.
APPLICATION FILED FEB. 2, 1907.
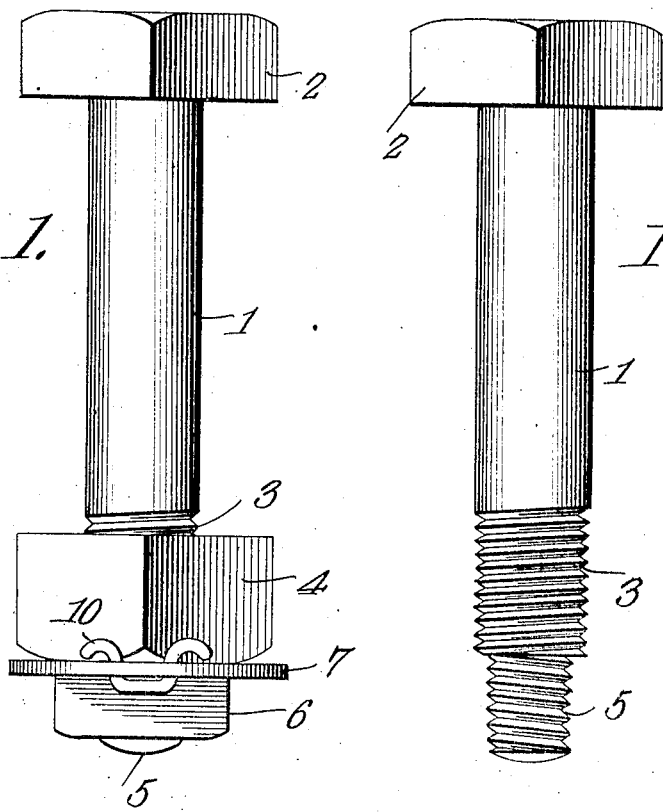
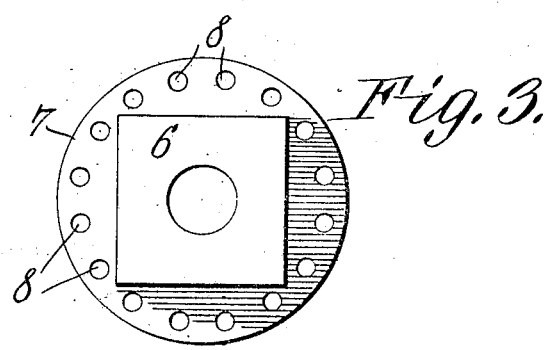
Hezekiah Miller,
INVENTOR.
WITNESSES:
By C. A. Snow & Co.
ATTORNEYS

UNITED STATES PATENT OFFICE.

HEZEKIAH MILLER, OF FORT MORGAN, COLORADO, ASSIGNOR OF ONE-HALF TO ISAAC C. FERREE, OF STERLING, COLORADO.

NUT-LOCK.

No. 856,976.  Specification of Letters Patent.  Patented June 11, 1907.

Application filed February 2, 1907. Serial No. 355,465.

*To all whom it may concern:*

Be it known that I, HEZEKIAH MILLER, a citizen of the United States, residing at Fort Morgan, in the county of Morgan and State of Colorado, have invented a new and useful Nut-Lock, of which the following is a specification.

This invention relates to nut locks, more particularly to that class employing a superimposed nut; and the object thereof is to provide a device of this character that will be cheap, durable, effective and easy of manipulation.

The invention consists in the construction, combination and arrangement of parts hereinafter fully described and claimed, and illustrated in the accompanying drawings, in which,—

Figure 1 is a side elevation of a bolt equipped with a nut lock constructed in accordance with this invention; Fig. 2 is a side elevation of the bolt; and Fig. 3 shows an end elevation of the lock nut.

Referring to the drawings, it is seen that the bolt 1 is provided with the usual head 2 at one end and has its opposite end provided with the usual right-hand threaded port on 3 and the usual primary nut 4, and, in addition, a reduced outer extremity 5 provided with left-hand threads and carrying the lock nut 6.

The lock nut 6 is provided upon its inner side with a laterally-extending flange 7 formed either integral with said lock nut or by means of a washer riveted to the nut: this flange is preferably circular in shape and of a diameter slightly greater than the long diameter of the primary nut, and is provided near its periphery with a series of uniformly spaced holes 8 adapted to receive a U-shaped locking pin 10, the parallel ends of the pin passing through alternate holes of the flange.

To lock the primary nut the lock nut is screwed down against it, binding it against displacement by the well-known action of the right and left-hand threads, and the lock nut itself is secured against displacement by means of the U-shaped locking pin which is inserted through the lock nut flange at one end or over an angle of the primary nut so as to bear against a side or adjoining sides of said nut. The ends of the lock pin may be bent slightly after insertion so as to secure the pin in position, thus completing the operation of locking the primary nut.

Having thus fully described the invention, what is claimed and desired to be secured by Letters Patent is:—

1. In a nut lock the combination of a bolt, a primary nut thereon, a lock nut provided with a laterally extending flange on its inner end and having a circular series of spaced holes within the periphery of said flange, and a locking pin adapted to engage a plurality of said holes and be bent into contact with the primary nut.

2. In a nut lock, the combination of a bolt provided with right and left-hand threads, a primary nut adapted to fit upon the right-hand threaded portion of said bolt, a lock nut adapted to fit upon the left-hand threaded portion of said nut and provided with a laterally-extending circular flange of a diameter slightly greater than the long diameter of the primary nut and having uniformly spaced holes arranged about the periphery of said flange, and a U-shaped locking pin adapted to engage in alternate holes of said flange, substantially as described and for the purpose set forth.

In testimony that I claim the foregoing as my own, I have hereto affixed my signature in the presence of two witnesses.

HEZEKIAH MILLER.

Witnesses:
OWEN R. SHIRKEY,
DAVE MILLER.